J. R. HAMILTON.
FUSIBLE LINK.
APPLICATION FILED JUNE 21, 1911.
1,024,725.
Patented Apr. 30, 1912.
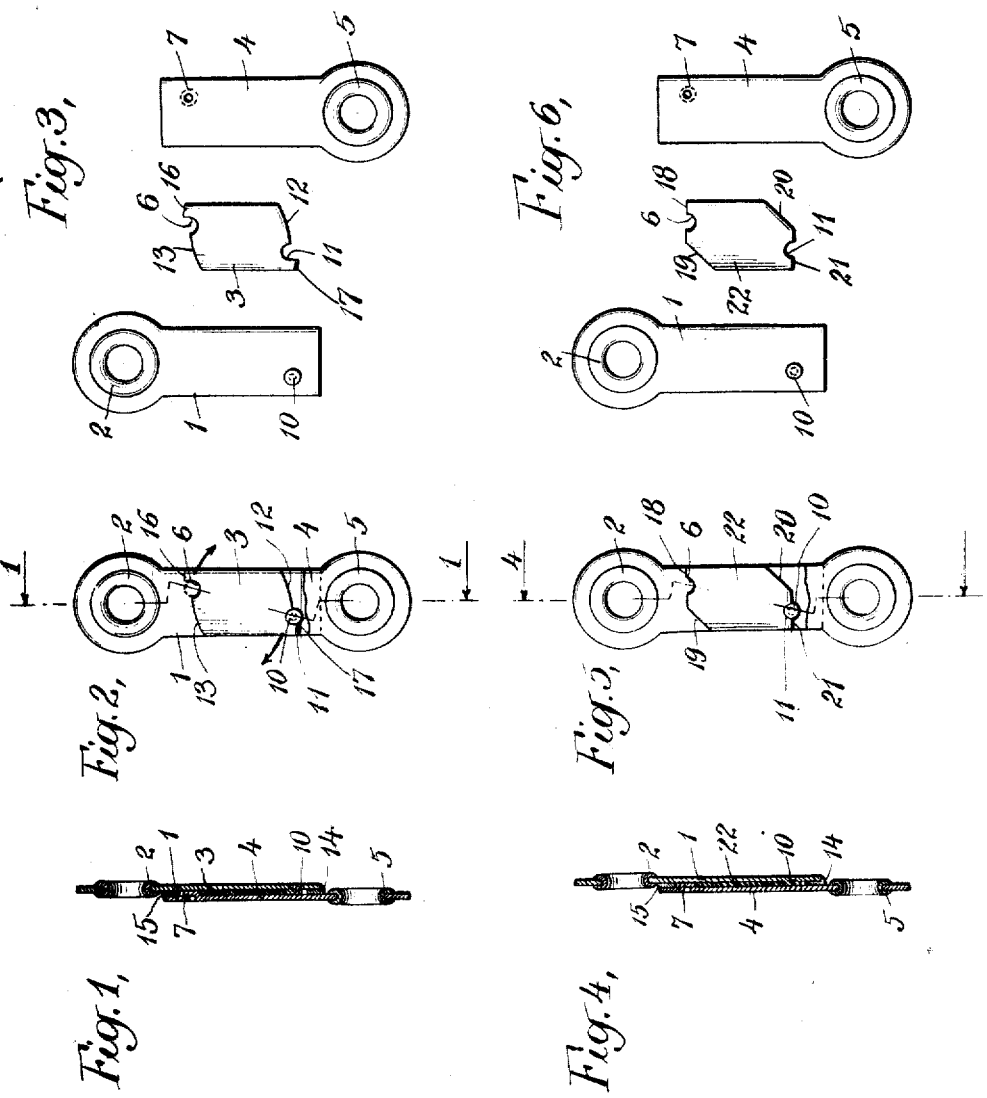

UNITED STATES PATENT OFFICE.

JOHN R. HAMILTON, OF YONKERS, NEW YORK, ASSIGNOR TO AUTOMATIC SPRINKLER COMPANY OF AMERICA, OF NEW YORK, N. Y., A CORPORATION OF NEW YORK.

FUSIBLE LINK.

1,024,725.   Specification of Letters Patent.   Patented Apr. 30, 1912.

Application filed June 21, 1911.   Serial No. 634,633.

*To all whom it may concern:*

Be it known that I, JOHN R. HAMILTON, a citizen of the United States, and resident of Yonkers, county of Westchester, State of New York, have invented certain new and useful Improvements Relating to Fusible Links, of which the following is a specification, taken in connection with the accompanying drawing, which forms part of the same.

This invention relates to fusible links and relates especially to fusible connecting links suitable for use with fire doors, windows and so forth.

The fusible links may comprise link members formed of sheet metal provided with integral pivots and an interposed strut having sockets adjacent its diagonally opposite corners, these members being releasably connected by fusible solder and so arranged that the diagonal sockets of the strut render the parts automatically disengaging in the plane of the link members and correspondingly promote their releasing action under emergency conditions.

In the accompanying drawings showing several illustrative embodiments of this invention, Figure 1 is a transverse section taken substantially along the line 1—1 of Fig. 2. Fig. 2 is a side view, parts being broken away, and Fig. 3 shows the parts in separated position. Fig. 4 is a side sectional view of another embodiment of the invention taken along the line 4—4 of Fig. 5. Fig. 5 is a side view thereof, parts being broken away. Fig. 6 is a view of this modification with the parts in separated position.

As indicated in Figs. 1 to 3, the fusible connecting link may comprise the link member or plate 1 provided with a centrally located hole or other attaching means for the flexible connector such as the chain, cord or the like with which the link may be used, and if desired the attaching hole in this link member may be provided with a suitable reinforcing ferrule, such as 2. This link member as indicated in Fig. 3 may be provided adjacent its free end with a suitable pivot 10 which may be readily formed integral with the link member by punching or stamping up this pivot from the sheet metal of which the link member may be constructed. The link may also comprise a similar link member 4 of sheet metal having a similar axially located attaching hole and ferrule 5 and also provided with the pivot 7 which may be similarly formed integral with the link member by punching, stamping or otherwise. The link may also comprise a suitable strut coöperating with the two link members and if desired interposed between them and provided with suitable diagonally arranged sockets coöperating with the pivots of the link members. The strut 3 may be formed of sheet metal and provided with suitable sockets 6 and 11 which may be diagonally located in any convenient position, preferably adjacent the diagonally opposite corners at the two ends of the strut so as to coöperate with the link member pivots and have an automatically disengaging action in the plane of the link members which tend to separate sidewise during their emergency release, as indicated by the arrows in Fig. 2. The ends of the strut are preferably formed with releasing edges and may be provided with suitable pivot shoulders 16, 17, preferably projecting slightly beyond the pivots and the strut also preferably having the curved releasing edges 12, 13 so as to further minimize interference with the movement of the parts as the strut swings laterally about the link member pivots. It is of course understood that the parts of the link may be releasably connected by any suitable fusible solder or material 14, 15 melting or becoming released when the temperature rises to the desired point, for instance. By making the operating parts of the strut and link members of the same width the assembly and soldering of the link is correspondingly facilitated.

When the link is in position with the link members connected to a suitable flexible connector which is kept under tension, the pivots and sockets have a positive action, preventing undesirable creeping of the solder or other releasable material and preventing the unintentional release of the link. Under emergency conditions, however, the solder or other material is released and the link members are thus free to separate in any direction under the strain of the attached connectors so that even if connected with stiff cord so that the flat link members are not free to move apart in substantially parallel position, the diagonal or non-axial arrangement of the pivots and coöperating sockets insures the swinging apart of the flat link members about the pivots so that the parts are effectively released, the contour of the strut ends minimizing the possibility of interference with any projecting portions of the solder during this releasing movement.

In the modified embodiment of the invention shown in Figs. 4 to 6, the parts are similarly constructed and arranged, except that the strut 22 is given a different contour and is provided with the square ends 18, 21 adjacent the diagonally arranged sockets 6 and 11 and with the relieved corners 19, 20 to minimize wedging or sticking during the release of the link.

Having described this invention in connection with a number of illustrative embodiments, forms proportions and arrangements of parts, to the details of which disclosure the invention is not of course to be limited, what is claimed as new and what is desired to be secured by Letters Patent is set forth in the appended claims.

1. The fusible connecting link having attaching means at its opposite ends and comprising a pair of link members each formed of sheet metal and provided with a reinforcing ferrule around the axial attaching means at one end and provided with an integral pivot stamped from the sheet metal and located away from the axis of the link member and adjacent its free end, a sheet metal strut interposed between said link members and provided with diagonally arranged sockets engaged by the pivots of the link members and having automatic disengaging action in the plane of the link members and provided with curved relieved ends comprising pivot shoulders on the diagonal corners of the strut adjacent said pivots and comprising curved relieved edges on the other diagonal corners of the strut, said parts being releasably connected by fusible solder to firmly retain the parts in normal holding position and to allow their emergency release.

2. The fusible connecting link having attaching means at its opposite ends and comprising a pair of link members each formed of sheet metal and provided with an integral pivot stamped from the sheet metal and located away from the axis of the link member and adjacent its free end, a sheet metal strut interposed between said link members and provided with diagonally arranged sockets engaged by the pivots of the link members and having automatic disengaging action in the plane of the link members and provided with curved relieved ends comprising pivot shoulders on the diagonal corners of the strut adjacent said pivots and comprising curved relieved edges on the other diagonal corners of the strut, said parts being releasably connected by fusible solder to firmly retain the parts in normal holding position and to allow their emergency release.

3. The fusible connecting link having attaching means at its opposite ends and comprising a pair of link members each formed of sheet metal and provided with an integral pivot stamped from the sheet metal and located away from the axis of the link member and adjacent its free end, a sheet metal strut interposed between said link members and provided with diagonally arranged sockets engaged by the pivots of the link members and having automatic disengaging action in the plane of the link members and provided with relieved ends comprising curved relieved edges on the unpivoted diagonal corners of the strut, said parts being releasably connected by fusible solder to firmly retain the parts in normal holding position and to allow their emergency release.

4. The fusible connecting link having attaching means at its opposite ends and comprising a pair of link members each formed of sheet metal and provided with an integral pivot stamped from the sheet metal and located away from the axis of the link member and adjacent its free end, a sheet metal strut interposed between said link members and provided with diagonally arranged sockets engaged by the pivots of the link members and having automatic disengaging action in the plane of the link members and provided with relieved ends, said parts being releasably connected by fusible solder to firmly retain the parts in normal holding position and to allow their emergency release.

5. The releasable link comprising a pair of link members each provided with a pivot located away from the axis of the link member and adjacent its free end, a strut interposed between said link members and provided with diagonally arranged sockets engaged by the pivots of the link members and having automatic disengaging action in the plane of the link members and provided with relieved ends, said parts being releasably connected to firmly retain the parts in normal holding position and to allow their emergency release.

6. The releasable link comprising a pair of link members each provided with a pivot located away from the axis of the link member, a strut interposed between said link members and provided with diagonally arranged sockets engaged by the pivots of the link members and having automatic disengaging action in the plane of the link members, said parts being releasably connected to firmly retain the parts in normal holding position and to allow their emergency release.

7. The fusible connecting link comprising a pair of link members each provided with attaching means adjacent the opposite ends of the link and adapted to be connected with devices normally holding the link in tension, a strut coöperating with said link members and diagonally arranged sockets and pivoting connections between said strut and said link members having automatic disengaging action in the plane of the link members, said parts being releasably connected to firmly retain the parts in normal holding position and to allow their emergency release.

8. The fusible connecting link comprising a pair of link members each provided with attaching means adjacent the opposite ends of the link and adapted to be connected with devices normally holding the link in tesion, a strut coöperating with said link members and diagonally arranged pivoting connections between said strut and said link members having automatic disengaging action in the plane of the link members, said parts being releasably connected to firmly retain the parts in normal holding position and to allow their emergency release.

9. The fusible connecting link comprising a pair of link members each provided with attaching means adjacent the opposite ends of the link, said link members being formed of sheet metal and adapted to be connected with devices normally holding the link in tension, a sheet metal strut interposed between said link members, and diagonally arranged pivoting connections between said strut and said link members having automatic disengaging action in the plane of the link members, (said parts being connected by releasable material to firmly retain the parts in normal holding position and allow their emergency release.

JOHN R. HAMILTON.

Witnesses:
HARRY L. DUNCAN,
JESSIE B. KAY.